United States Patent [19]

Lebas et al.

[11] Patent Number: 4,710,329

[45] Date of Patent: Dec. 1, 1987

[54] METHOD OF MANUFACTURING ARTICLES OF COMPACTED POWDER

[75] Inventors: Jean-Marie Lebas, Rueil-Malmaison; Pierre Rat, Massy; Jean-Marcel Dupont; Germain Vinuesa, both of Angouleme, all of France

[73] Assignees: Basset Bretagne Loire - B.B.L.; Societe Nationale des Poudres et Explosifs, both of France

[21] Appl. No.: 610,696

[22] Filed: May 16, 1984

Related U.S. Application Data

[60] Continuation of Ser. No. 314,052, Oct. 23, 1981, abandoned, which is a division of Ser. No. 72,584, Sep. 5, 1979, Pat. No. 4,330,251.

[30] Foreign Application Priority Data

Sep. 12, 1978 [FR] France ................ 78 26140

[51] Int. Cl.$^4$ ............................................ C06B 21/00
[52] U.S. Cl. ...................................... 264/3.1; 102/292
[58] Field of Search ............................ 602/283–292; 419/42, 49; 264/0.5, 3 R, 3.1

[56] References Cited

U.S. PATENT DOCUMENTS

| | | | |
|---|---|---|---|
| 3,407,736 | 10/1968 | Beuschel | 102/291 |
| 3,497,578 | 2/1970 | Glass et al. | 264/3 R |
| 3,754,510 | 8/1973 | Marondel et al. | 102/285 |
| 3,763,291 | 10/1973 | Loedding | 264/3 R |
| 3,911,825 | 10/1975 | Gawlick et al. | 102/285 |
| 3,912,798 | 10/1975 | Rachor et al. | 264/0.5 |
| 3,954,062 | 5/1976 | Dunlop et al. | 264/3 R |
| 3,956,452 | 5/1976 | Saito | 419/42 |
| 3,982,934 | 9/1976 | Wentzell | 419/49 |
| 4,000,235 | 12/1976 | Leemput | 419/42 |
| 4,052,943 | 10/1977 | Elrick | 102/290 |
| 4,092,384 | 5/1978 | Hrovat | 264/0.5 |
| 4,097,276 | 6/1978 | Six | 419/49 |
| 4,148,187 | 4/1979 | Yourkin | 102/287 |
| 4,189,460 | 2/1980 | McBride | 102/283 |
| 4,202,713 | 5/1980 | Ragon et al. | 102/283 |
| 4,326,901 | 4/1982 | Leneven et al. | 264/3 R |
| 4,327,154 | 4/1982 | Rossmann | 419/33 |
| 4,401,723 | 8/1983 | Åslund et al. | 419/42 |

FOREIGN PATENT DOCUMENTS 210724  3/1968  U.S.S.R. ................ 264/3 R

*Primary Examiner*—Edward A. Miller
*Attorney, Agent, or Firm*—Steinberg & Raskin

[57] ABSTRACT

A method and a mould for manufacturing articles of compacted powder by isostatic compression of powder in a mould, which is made of flexible material of substantially constant thickness and is substantially barrel-shaped, the mould having at one end a bottom made integral with the rest of the mould and being adapted to be closed by a separate plug at its other end.

7 Claims, 6 Drawing Figures

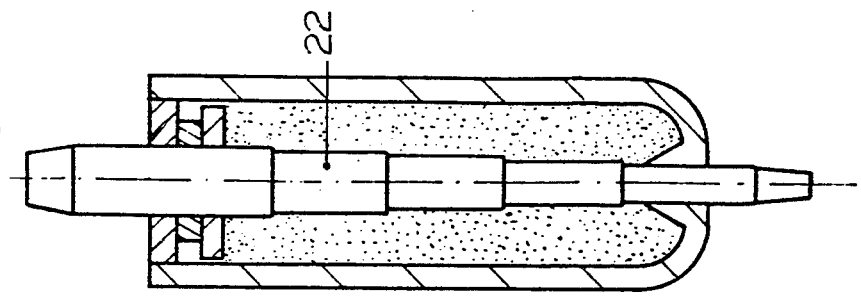
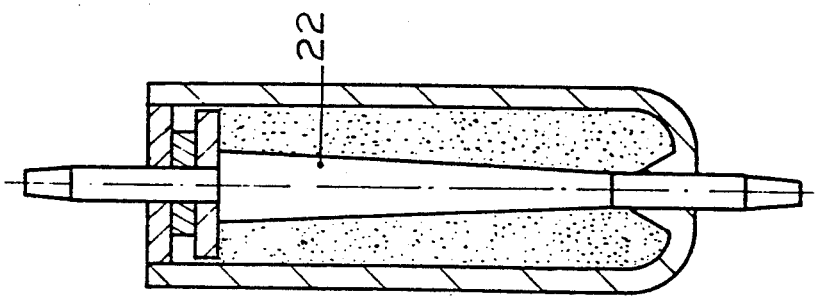

METHOD OF MANUFACTURING ARTICLES OF COMPACTED POWDER

This is a continuation of co-pending application Ser. No. 314,052 filed Oct. 23, 1981, now abandoned, which is a divisional of co-pending application Ser. No. 72,584 filed Sept. 5, 1979 and now U.S. Pat. No. 4,330,251, issued May 18, 1982.

BACKGROUND OF THE INVENTION

The present invention relates generally to a method for manufacturing articles or elements of pressure agglutinated, agglomerated, coalesced or consolidated powder, hereinafter referred to as "compacted powder" or "compact", obtained by compressing a predetermined amount of powder in molds.

The said method relates more particularly to the manufacture of unit charges of compacted powder for small-, medium- and large-caliber arms ammunition and small self-propelling appliances. The invention, however, also applies to the manufacture of any unit articles or elements of compacted powder, e.g. of metal, metal alloy or any other material in powder form, which are obtained by filling molds with powder in bulk and then compressing the same to form unit elements of compacted powder.

The molds used in the prior art are metal molds constituted by hollow cylinders at least one end of which is closed by a movable punch of a press. Each mold is filled with powder and then the punch or punches actuated by the press move within the mold and compress the powder. Very good dimensional characteristics are thus obtained, as the mold and the punch or punches are substantially indeformable. However, as a direct result of the mechanical compression of the powder within the molds by means of the punch or punches, the density of the compact resulting from the compression is not uniform throughout the mass of the article thus obtained. Where the articles are unit charges of compacted propelling powder, this final poor homogeneity results in an uneven combustion of the powder and therefore a deterioration of the firing or shooting characteristics.

Moreover, the mechanical compression of the powder in a metal mold in a press requires considerable investment and the production rates are very low. The manufacture of such articles therefore proves to be highly expensive.

Attempts have therefore been made, in the manufacture of unit articles or elements of compacted powder, to replace mechanical compression in metal molds and by means of metal punches by isostatic pressing in molds of flexible and/or resilient material, which are filled with powder, closed substantially sealingly and placed in a pressure chamber filled with a substantially incompressible fluid in order to be subjected to isostatic compression. It has been found that much better results can thus be obtained from the point of view of the final homogeneity of the elements (and more particularly a highly even density, therefore a highly even combustion and very good firing characteristics) and of the production rates, which are extremely improved compared with those of the mechanical presses, while at the same time considerably reducing investments.

However, such important improvements in the final density of the articles and in production rates are obtained to the detriment of the dimensional characteristics. These, which were excellent in the mechanical compression method, are much poorer in the case of isostatic compression for the molds of flexible and/or resilient material are necessarily deformed during the compression. It has been found that this deformation is uneven and much more marked in the intermediate region of the molds than in its sealingly closed end regions, so that the compacted powder articles obtained do not have a perfectly straight cylindrical shape but are smaller in diameter in their intermediate region than at their ends.

SUMMARY OF THE INVENTION

The purpose of the present invention is precisely to remedy the drawbacks of the above two known methods while at the same time retaining their advantages.

The invention is therefore directed to a method for manufacturing unit articles or elements of compacted powder displaying very good dimensional characteristics and highly uniform density and which can be manufactured at very high production rates and with much less investments than in the case of mechanical compression.

To this end, the method according to the invention provides a mold for manufacturing articles or elements of compacted powder obtained by compressing a predetermined amount of powder in the mold, characterized in that the mold is an isostatic compression mold made of a flexible and/or resilient material of substantially constant thickness and intended to be confined with its powder charge in a pressure chamber filled with a substantially incompressible fluid in order to be subjected in the said chamber to an isostatic compression, the said mold having a substantially cylindrical tubular shape, comprising for example at one end a bottom portion formed integral with the rest of the mold, and the opposite end of which can be closed by a removable plug, the said mold being substantially barrel-shaped and being of larger inner diameter in its intermediate portion than at its ends.

It is understood that this shape characteristic according to the invention allows the shape unevenness displayed formerly by a compacted powder element obtained in a mold of perfectly straight cylindrical shape to be compensated for.

The method of manufacturing unit articles or elements of compacted powder, by means of molds of the previously described type, is further characterized in that it consists in filling each mold with a predetermined amount of powder, in closing the molds by means of the aforementioned plugs, in arranging them in a pressure chamber filled with a substantially incompressible fluid, in compressing the fluid to subject the molds and their powder charges to isostatic compression for a predetermined length of time, in restoring the normal pressure and then in removing the molds from the chamber and withdrawing from the molds the articles obtained.

It is understood that, according to the method of the invention, a large quantity of molds can be placed within a same pressure chamber to subject them simultaneously to isostatic compression, thus quite considerably increasing production rates.

BRIEF DESCRIPTION OF THE DRAWINGS

The invention will be better understood and other purposes, characterizing features, details and advantages of the latter will appear more clearly from the following explanatory description made with reference to the appended diagrammatic drawings given solely by way of example illustrating two forms of embodiment of the invention and wherein:

FIGS. 5 and 6 are views similar to FIG. 1 and illustrating the use of tapered and stepped cores, respectively.

DESCRIPTION OF THE PREFERRED EMBODIMENTS

Figure 1:
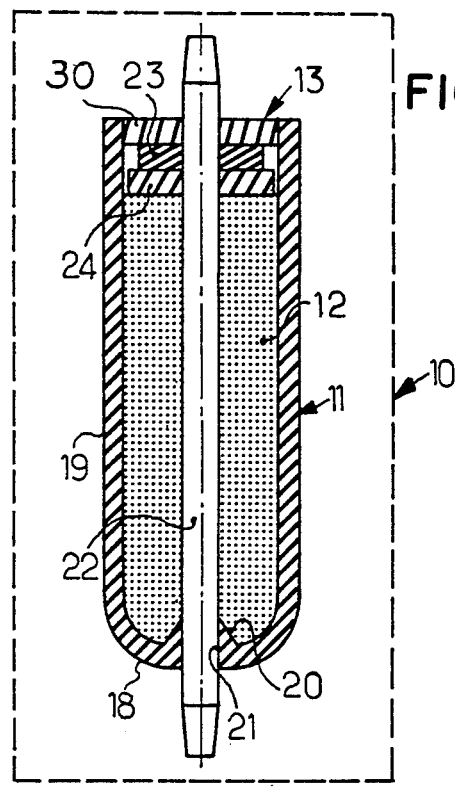
FIG. 1 is a diagrammatic view of a mold provided by the method according to the invention filled with powder and placed in an isostatic compression chamber represented in dashed lines.

There is diagrammatically shown in FIG. 1 a device for manufacturing unit articles or elements of pressure agglutinated, agglomerated, coalesced or consolidated powder referred to as "compacted powder" or "compact", by the method according to the invention, which comprises essentially a pressure chamber 10 represented conventionally by dashed lines and which is intended to contain a large number of molds 11 according to the invention filled with a predetermined amount of powder 12 and substantially sealingly closed at their open end by a plug, stopper or the like 13.

The chamber 10 may be of any suitable type known in the art and is filled substantially completely with an incompressible fluid such as oil, which can be subjected to high pressure, e.g. of the order of from 1000 to 1500 bars during an appropriate predetermined length of time. Chambers of this type are well known in the art and will therefore not be described in more detail.

Figure 2:
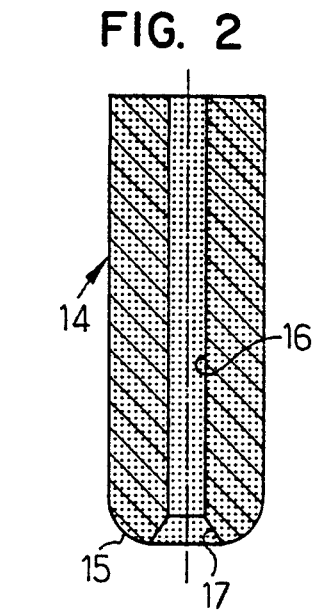
FIG. 2 is a sectional view of a compacted unit article obtained by the mold provided by the method of the invention.

In the specific example of embodiment illustrated in the drawings, the articles to be obtained may be, in particular, unit charges of compacted propelling powder for small-, medium- and large-caliber arms ammunition and for small self-propelling appliances, one of which is shown in section in FIG. 2.

The unit charge 14 is of substantially straight cylindrical shape, one end of which is of plane cross-section and circular periphery, and the opposite end of which is rounded off at the angles as shown in the drawing. The unit charge 14 has an axial bore 16 opening at the rounded end 15 through a counter-sunk portion 17. The bore 16 may be of constant circular section as shown in FIG. 2, but it may, in some cases, be of non-uniform section varying regularly, gradually or by steps.

In the case of a unit charge 14 to be used for ammunition, it is constituted by nitrocellulose-based powder grains which are agglutinated, agglomerated or bound together by means of a gelatinizing plasticizer for nitrocellulose, which is liquid at a temperature lower than or equal to about 80° C. and which is present in a small predetermined amount. The process of manufacture of such unit charges therefore consists in impregnating the nitrocellulose-based powder grains with a geletanizing plasticizer, in stabilizing the powder grains thus impregnated by allowing them to stand at room temperature for a predetermined length of time, in placing the powder grains in a mold, in heating the mould and its contents to a temperature preferably approximating 80° C., in subjecting the powder charge to a predetermined pressure, in cooling the mold and its contents and in removing from the mold the unit charge thus obtained.

According to the method, the compression to which the powder is subjected is an isostatic compression by means of the device illustrated in FIG. 1.

In this example, the mold 11 is closed at one end by a bottom wall 18 formed integral with the substantially cylindrical portion 19 of the mold, the other end of the mould 11 being open and intended to be closed by the removable plug 13. The bottom 18 of the mold 11 is provided with an axial inwardly protruding annular boss, neck or collar 20 externally shaped substantially as a truncated cone, intended to form the countersunk portion 17 of the unit charge 14. The truncated conical collar or neck 20 is provided with an axial bore 21 through which is substantially sealingly mounted within the mold 11 an axial core 22.

The axial core 22 is made of a rigid, substantially indeformable material, e.g. of metal. The core 22 is intended to form the axial bore 16 of the unit charge. It may therefore be of either constant circular section or of circular section varying regularly, gradually or by steps as seen in FIGS. 5 and 6. The core 22 is greater in length than the mold 11 so as to protrude from the mold at both its ends, which, in order to facilitate the mounting of the core in the mold, may be of truncated conical shape as shown in FIG. 1.

In the case of a mold 11 provided with a core 22, the plug 13 is constituted by superposed annular discs or rings 30, 23 and 24, respectively, all provided with an axial opening allowing them to be engaged substantially sealingly onto the metal core 22. The ring 30 has a diameter substantially equal to the inner diameter of the open end of the mold 11 so as to substantially sealingly close that end. The inner ring 24 is slightly smaller in diameter, corresponding substantially to the final diameter of the unit element 14 to be obtained. The ring 24 is intended to bear upon the powder charge 12 placed within the mold 11. Lastly, the intermediate ring 23 is slightly smaller in diameter than the inner ring 24 and serves as a distance piece the purpose of which will be explained below in more detail.

Of course, in the case of a mold 11 that is not provided with an axial core 22, the plug 13 is constituted by plane discs instead of rings.

The mold 11 and the rings 30, 23 and 24 are made of flexible and/or resilient material, advantageously of rubber. In the case considered, where the powder must also be subjected to a heating up to a temperature of about 80° C., use is advantageously made of molds and rings of nioprene, which withstands higher temperatures, for example of the order of 100° C. or more.

Figure 3:
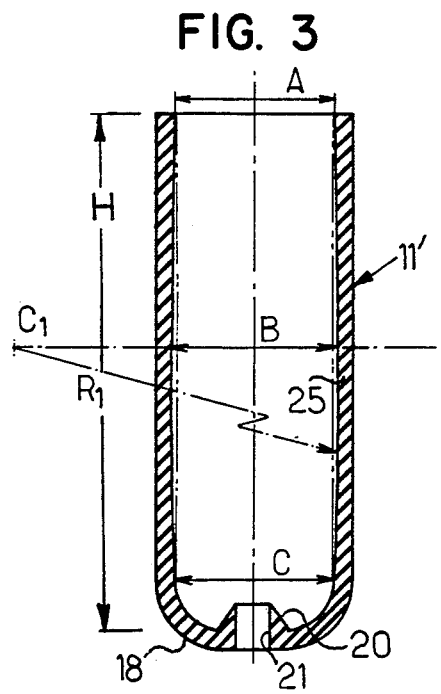
FIG. 3 is a sectional view of a mold according to a first form of embodiment of the invention.
Figure 4:
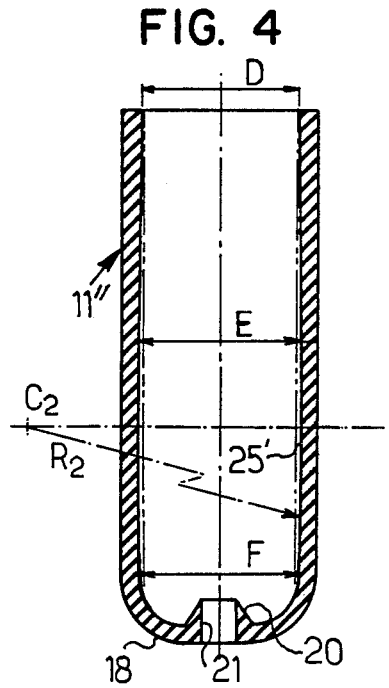
FIG. 4 is a sectional view of a mold according to a modified form of embodiment provided by the method of the invention.

According to the invention, the mold 11 is of substantially constant thickness, except of course at the collar 20 formed at the bottom 18, and in its normal condition is substantially barrel-shaped, that is to say, its inner diameter in its medial or axially intermediate portion is greater than its inner diameter in proximity to its ends, as seen better in FIGS. 3 and 4.

The mold 11' shown in FIG. 3 comprises a bottom portion 18 provided with a collar or neck 20 with an axial bore 21 and its inner diameter A at its open end is equal to its inner diameter C in proximity to the bottom 18, whereas its inner diameter B at the middle of its height is greater than the diameters A and C. Each generatrix 25 of the substantially cylindrical portion of the mold 11' is formed substantially by an arc of a circle whose radius of curvature R1 is of relatively great length compared with the height of the mold 11'. The centers of curvature C1 of the generatrices 25 are located substantially at the middle of the height of the mold 11' of FIG. 3.

In the form of embodiment illustrated in FIG. 4, the mold 11" also comprises a rounded bottom portion 18 provided with an axial inwardly protruding annular boss, neck or collar 20 with an axial bore 21, and its diameter E in its intermediate region is greater than its inner diameter F at its bottom 18, which itself is greater than the diameter D at its open end. As in the preceding case, each generatrix 25' of the cylindrical portion of the mold 11" is constituted by an arc of a circle whose radius of curvature R2 is of relatively great length compared with the height of the mold 11", but the centers of curvature C2 are shifted towards the bottom 18, that is to say, they are located nearer to the bottom 18 than to the open end of the mold. This arrangement may prove to be advantageous in some cases in order to better compensate for the unevenness in shape of the element to be obtained, due to the proximity of the bottom 18 and the collar 20.

In order to obtain the "barrel" shape suitable for a given application, a test can be carried out under specific grain-size and temperature conditions, with a mold that is either cylindrical or of barrel-shape already obtained, in order to measure the compacting bend, flexion or buckling. The measured differences between the element obtained and the article to be obtained allow the profile of the "barrel" shape of the final mold to be determined.

By way of example, it may be mentioned that the molds 11' and 11" may display the following dimensional characteristics in their normal condition:

A = C = 32.6 mm;
B = 33.8 mm;
R1 = 1880 mm;
D = 32.2 mm;
F = 32.8 mm;
E = 33.4 mm;
R2 = 2500 mm;

the total height of the molds being of the order of 110 mm.

The method of using such molds is as follows.

The cores 22 are first placed into the molds 11, then the molds are filled with a predetermined amount of powder and are thereafter closed by means of the rings 24, 23, 30 which are engaged in this order onto the corresponding end of the core 22. It will be noted by the way that the plug 13 may also be formed in a single piece having the shape of the rings 30, 23 and 24 superposed on one another. The molds 11 thus prepared are placed into the chamber 10 and subjected to isostatic compression under a pressure of the order of from 1000 to 1500 bars. The total duration of treatment of the molds 11 in the chamber 10 is of the order of about 5 minutes including the building up and the removal of pressure in and from the chamber. In the case of propelling powder charges for ammunition, which are constituted by nitrocellulose-based powder grains impregnated with a gelatinizing plasticizer, the molds are also subjected within the chamber ot a temperature of the order of 80° C. approximately.

When the normal pressure is restored in the chamber, the molds 11 are withdrawn from the chamber and the unit charges 14 are extracted from the molds. Extraction from the molds is performed without difficulty, for the volume occupied within the mold by the compacted powder is smaller than the internal volume of the mold in its normal state. A certain clearance therefore exists between the inner surface of the mold and the compacted powder charge. Nor does the extraction of the core present any difficulty because, during the compression, the small volume of air contained in the powder gathers around the core 22, thus forming a kind of film between the core and the surface of the axial bore 16 of each unit charge 14.

The charges 14 thus obtained display good dimensional characteristics and have a substantially straight cylindrical shape, the maximum bend, flexion or buckling observed does not exceed 2/10ths of a millimeter in the case of an outer diameter of about 29 mm. By way of example, it may be mentioned that if use is made of a mold 11 which in its normal condition has a substantially cylindrical shape, the charges 4 obtained will display in their middle region a bend of about 1 mm in the case of a diameter of about 29 mm.

Also the dimensional characteristics of the charge 14 in the region of its ends are quite satisfactory. In particular, the presence of the spacer ring 23 in the removable plug 13 allows the edge or fringe effect due to the plug 13 closing the end of the mold 11 to be attenuated. Indeed, the end of the mold 11 displays an unevenness in shape and thickness with respect to the rest of the mold, which unevenness results in a dimensional unevenness of the plane end face of the charge 14. This final dimensional unevenness is the less marked, the greater the distance between this end of the charge 14 and the ring 30 closing the mold 11. The spacer ring 23 is precisely used for this purpose.

Of course, the invention is by no means limited to the formes of embodiment described and illustrated, which have been given by way of example only. In particular, it comprises all means constituting technical equivalents to the means described as well as their combinations should the latter be carried out according to its gist and used within the scope of the following claims.

What is claimed is:

1. A method of manufacturing articles of compacted propellant powder for arms ammunition of substantially uniform density and substantially straight cylindrical shape with minimum bend, comprising the successive steps of providing at least one hollow mold made from flexible or resilient material having an approximately cylindrical tubular side wall of substantially constant wall thickness and a bottom wall integral with said side wall at one end thereof, and a removable plug insertable into an opposite open end of said mold for closing the same in sealing relationship, said side wall being lengthwise curved radially outwardly all around through a thickness thereof to a barrel-like shape over one longitudinal portion intermediate of the ends thereof in a normal condition of the mold;

providing a pressure chamber adapted to be filled with a substantially incompressible fluid and to accommodate at least one mold therein;

providing nitrocellulose-based powder grains, and impregnating the grains with a small predetermined amount of a suitable gelatinizing plasticizer which is liquid at a temperature lower than or equal to about 80° C. for bonding said grains together;

filling the mold with an amount of powder appropriate to form a unit charge to cause the same to assume, in its confined condition, a substantially barrel-shaped configuration with an intermediate bulge;

tightly closing the mold with said removable plug;

placing the mold into said pressure chamber filled with said substantially incompressible fluid;

heating said mold and its contents to a temperature of about 80° C. and then building up an adequate pressure within said chamber to subject said mold and its powder contents to an isostatic compression for a pre-determined period of time to cause said side wall to be deformed to a substantially perfect cylindrical shape;

restoring normal pressure within said chamber; and removing said mold from said chamber and then cooling said mold and its contents and withdrawing the compacted powder article thus obtained from said mold.

2. The method of claim 1 additionally comprising;

providing within said chamber an isostatic pressure of between about 1,000 bars and 1,500 bars for a few minutes.

3. The method of claim 2, wherein the total duration of treatment of each mold in said chamber is of the order of about 5 minutes including the pressure build-up and release in and from said chamber, respectively.

4. The method of claim 1 for making an article formed with an axial bore, further comprising, prior to filling said mold with said powder, fitting a substantially rigid indeformable axial core in substantially coaxial relationship into said mold to extend throughout the height thereof.

5. The method of claim 1, further comprising;

stabilizing the impregnated powder by allowing the same to stand at room temperature for a predetermined period of time before filling the mold therewith.

6. The method of claim 1, further comprising;

forming an end of said powder charge which is near the end of said mold receiving said plug, with a substantially flat end face and spacing the same substantially away from said plug.

7. The method of claim 6, wherein said spacing step comprises providing inside said mold, a flat inner disc of substantially resilient material with a diameter slightly smaller than an inner diameter of the open end of said mold receiving said plug and corresponding substantially to the final diameter of the article to be obtained;

causing said disc to bear upon said flat end face of said powder charge; and providing an intermediate spacer disc slightly smaller in diameter then said inner disc and interposed between the inner disc and said plug in engaging relationship therewith.

* * * * *